S. H. DICKERSON.

Well-Tubes.

No. 5,507.

Reissued July 29, 1873.

Witnesses:

Henry N. Miller

C. L. Emerson

Inventor.

Samuel H. Dickerson, per Alexander Neiston

Attorneys.

UNITED STATES PATENT OFFICE.

SAMUEL H. DICKERSON, OF HUDSON, MICHIGAN.

IMPROVEMENT IN WELL-TUBES.

Specification forming part of Letters Patent No. 100,609, dated March 8, 1870; reissue No. 5,507, dated July 29, 1873; application filed May 20, 1873.

DIVISION A.

*To all whom it may concern:*

Be it known that I, SAMUEL H. DICKERSON, of Hudson, in the county of Lenawee and in the State of Michigan, have invented certain new and useful Improvements in Well-Tubes; and do hereby declare that the following is a full, clear, and exact description thereof, reference being had to the accompanying drawings and to the letters of reference marked thereon.

The nature of my invention consists in the mode or manner of setting in the screen in a well-tube.

In order to enable others skilled in the art to which my invention appertains to make and use the same, I will now proceed to describe its construction and operation, referring to the annexed drawings which form a part of this specification, and in which—

Figure 1:
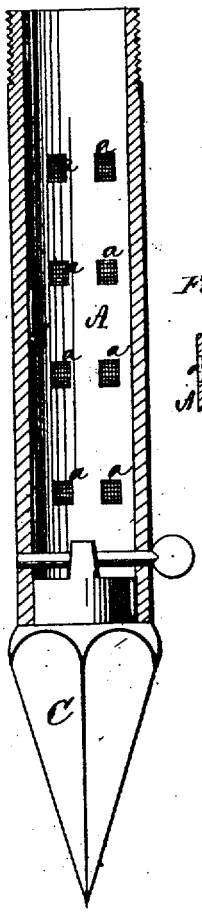
Figure 3:
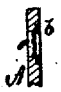
Figure 2:
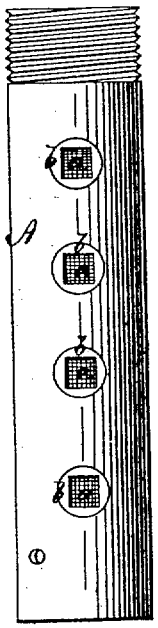

Figure 1 is a vertical section of the well-tube with a point or plug attached. Fig. 2 is a side view of the tube; and Fig. 3 is a section of the pipe, showing the mode of fastening or setting in the screen.

A represents a well-tube, which is provided with any suitable number of holes, around each of which is a countersink deep enough to receive a piece of wire gauze, *a*, and a cap, *b*. The caps *b b* are of such size as to fit snugly in the countersinks around the holes, and each cap has a suitable opening in the center, through which the screens *a a* are seen. The wire-gauze is first placed in the countersink, and then the cap pressed on top of the same and held in the countersink by friction or any other suitable means.

By this construction of the holes in the tube and the caps in the same the screen or wire-gauze *a* cannot be torn or injured by being turned or driven through the gravel or dirt; and it also dispenses with a trial-tube, as it can be started from the surface.

The filter, formed of the screens above described, follows a point, C, or an auger, down in the earth until water is reached. This is ascertained by its coming through the tube. Any suitable auger may be used with this tube, or any suitable point may be employed on its end. In ground where solid rocks are found I usually attach a solid point, C, to the end of the tube, and force the same down until water is reached. Where few or no rocks are found I attach an auger to the tube and bore down until water is reached, when I withdraw the tube and detach the auger, and then apply a point, C, and replace the tube in the earth.

Having thus fully described my invention, what I claim as new, and desire to secure by Letters Patent, is—

The well-tube A having countersunk holes, the screens *a a*, and caps *b b*, placed within the countersunk holes over the edges of the screens, all substantially as and for the purposes herein set forth.

In testimony that I claim the foregoing I have hereunto set my hand this 20th day of May, 1873.

S. H. DICKERSON.

Witnesses:
J. M. MASON,
C. M. ALEXANDER.